United States Patent
Hofmann et al.

(10) Patent No.: US 6,442,932 B1
(45) Date of Patent: Sep. 3, 2002

(54) METHOD AND DEVICE FOR THE CATALYTIC REDUCTION OF NITROGEN OXIDES CONTAINED IN THE OFF-GAS FROM A COMBUSTION SYSTEM

(75) Inventors: Lothar Hofmann, Altenkunstadt; Günther Pajonk, Zapfendorf; Manfred Weigl, Viehhausen; Gerhard Wissler, Sünching, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/695,519

(22) Filed: Oct. 24, 2000

Related U.S. Application Data

(63) Continuation of application No. PCT/DE99/01097, filed on Apr. 12, 1999.

(30) Foreign Application Priority Data

Apr. 24, 1998 (DE) .......................... 198 18 448

(51) Int. Cl.[7] .................................. F01N 3/00
(52) U.S. Cl. ..................... 60/274; 60/286; 60/295; 60/303
(58) Field of Search .................. 60/286, 295, 303, 60/274, 277; 422/177, 180, 183

(56) References Cited

U.S. PATENT DOCUMENTS

| | | | | |
|---|---|---|---|---|
| 5,643,536 A | * | 7/1997 | Schmelz | 422/105 |
| 5,709,080 A | * | 1/1998 | Arora et al. | 60/274 |
| 5,842,341 A | * | 12/1998 | Kibe | 60/274 |
| 5,950,422 A | * | 9/1999 | Dolling | 60/274 |
| 6,119,448 A | * | 9/2000 | Emmerling et al. | 60/274 |
| 6,192,676 B1 | * | 2/2001 | Zurbig et al. | 60/286 |

FOREIGN PATENT DOCUMENTS

| | | |
|---|---|---|
| DE | 3337793 C2 | 3/1988 |
| DE | 4315278 A1 | 11/1994 |
| DE | 4432577 A1 | 3/1996 |
| DE | 19536571 C2 | 9/1998 |
| EP | 0898061 A2 | 2/1999 |

* cited by examiner

Primary Examiner—Thomas Denion
Assistant Examiner—Binh Tran
(74) Attorney, Agent, or Firm—Laurence A. Greenberg; Werner H. Stemer; Ralph E. Locher

(57) ABSTRACT

To ensure the maximum possible conversion of nitrogen oxides in a $DeNO_x$ catalytic converter in an off-gas cleaning installation for reducing nitrogen oxides and, at the same time, to prevent the reducing agent which is used for the reduction from escaping into the environment, there is provision for the density of a reducing agent solution to be used to determine the volume of the reducing agent solution which is to be metered. The density is regulated in two ways, in that the temperature of the reducing agent solution is measured using a temperature sensor and set by a temperature-control device.

15 Claims, 2 Drawing Sheets

METHOD AND DEVICE FOR THE CATALYTIC REDUCTION OF NITROGEN OXIDES CONTAINED IN THE OFF-GAS FROM A COMBUSTION SYSTEM

CROSS-REFERENCE TO RELATED APPLICATION

This is a continuation of copending International Application PCT/DE99/01097, filed Apr. 12, 1999, which designated the United States.

BACKGROUND OF THE INVENTION

Field of the Invention

The invention relates to a method and a device for the catalytic conversion of nitrogen oxides contained in the off-gass from a combustion system, in particular in an exhaust gas from an internal combustion engine operated with excess air, for example a diesel engine.

During the combustion of a fossil fuel, such as petroleum or coal, in a combustion system, in particular of diesel fuel in a diesel engine, nitrogen oxides that are hazardous to the environment are formed, inter alia. To reduce the emissions of nitrogen oxides to the environment, the use of a catalytic converter disposed in the off-gas line of a combustion system is known, inter alia, in the power plant sector. The catalytic converter is used to catalytically convert the nitrogen oxides contained in the off-gas into substances that are not hazardous.

In an internal combustion engine that is operated with excess air, nitrogen oxides are removed from the exhaust gas using, for example, a selective catalytic reduction (SCR) process. In this case, a reducing agent is introduced into the exhaust gas before it flows through a so-called SCR or $DeNO_x$ catalytic converter, which reducing agent converts the nitrogen oxides which are contained in the exhaust gas, in the presence of oxygen, at the catalytic converter to form harmless nitrogen and water. The reducing agent used is generally ammonia. The reducing agent is introduced into the exhaust gas in the form, for example, of a reducing agent solution from which the actual reducing agent is released. In the case of ammonia, a reducing agent solution of this type is, for example, an aqueous urea solution. In this respect, see the Siemens brochure, titled "$SINO_x$, Stickoxidminderung für stationäre Dieselmotoren" [$SINO_x$, Nitrogen Oxide Abatement For Steady-State Diesel Engines], 1997, order No. A96001-U91-A232.

When reducing the levels of nitrogen oxides using the SCR process, it is always necessary for an amount of reducing agent that is adapted to the current nitrogen oxide emissions to be introduced into the exhaust gas. This on the one hand leads to a high conversion rate for the nitrogen oxides at the catalytic converter and on the other hand prevents too much reducing agent from being introduced, which then leaves the catalytic converter together with the exhaust gas and enters the environment. The emission of reducing agent into the environment is also known as slippage. This phenomenon is to be avoided in particular when using ammonia, in order to avoid additional pollution of the environment.

Particularly in the case of combustion systems that are not operated in a steady state, it is difficult to determine the amount of reducing agent that needs to be introduced per unit time. Examples of combustion systems which are operated in a non steady state include diesel engines which are used in the automotive sector and are operated with frequent load changes. Therefore, the emission of nitrogen oxides may vary considerably within short periods of time. Consequently, it is also necessary for the amount of reducing agent metered in to vary quickly and to be accurately adjusted. The amount of reducing agent to be introduced therefore needs to be controlled according to demand. The current demand is determined on the basis of parameters that characterize the operating state of the combustion system. In a diesel engine, these parameters are, for example, the engine speed, the torque, the operating temperature or the fuel consumption. It is known from Published, Non-Prosecuted German Patent Application DE 19 536 571 A1 to additionally use parameters which characterize the operating state of the catalytic converter. Examples of these parameters are the capacity of the catalytic converter to store the reducing agent, the operating temperature and/or the catalytic activity of the catalytic converter.

The amount of reducing agent required for conversion of the nitrogen oxides is determined from the various parameters, for example on the basis of a characteristic diagram. To determine the volume of reducing agent solution which is to be metered per unit time, when using a reducing agent solution it is additionally necessary to take into account the properties, for example the concentration, of this solution. Generally, the amount of reducing agent is determined in such a way that slightly less reducing agent than is required for conversion of the nitrogen oxides is fed to the catalytic converter, so that slippage is avoided under all circumstances. The catalytic converter is therefore operated at below the conversion rate that is theoretically possible. The conversion rate indicates the proportion of nitrogen oxides that are reduced at the catalytic converter.

SUMMARY OF THE INVENTION

It is accordingly an object of the invention to provide a method and a device for the catalytic reduction of nitrogen oxides contained in the off-gas from a combustion system that overcomes the above-mentioned disadvantages of the prior art methods and devices of this general type, in which slippage of the reducing agent is reliably avoided and, at the same time, a high conversion rate for the nitrogen oxides at the catalytic converter is achieved.

With the foregoing and other objects in view there is provided, in accordance with the invention, a method for a catalytic reduction of nitrogen oxides contained in a medium flow output from a combustion system. The method includes the steps of:

a) channeling an off-gas towards and through a catalytic converter;

b) metering a reducing agent solution into the off gas before it flows through the catalytic converter;

c) determining an amount of dissolved reducing agent to be metered per unit time according to demand; and d) using a density of the reducing agent solution to determine a volume of the reducing agent solution to be metered per unit time.

According to the invention, to achieve the object in the method for the catalytic reduction of nitrogen oxides, in particular of nitrogen oxides contained in the exhaust gas from an internal combustion engine operated with excess air, the off gas flows through a catalytic converter. A reducing agent solution is metered into the off gas before it flows through the catalytic converter, and the amount of dissolved reducing agent which is to be metered per unit time is determined according to demand. The density of the reducing agent solution is used to determine the volume of reducing agent solution that is to be metered per unit time.

The invention is based on the consideration that, if the reducing agent solution is metered volumetrically, the amount of reducing agent metered in is influenced by the density of the reducing agent solution. Density fluctuations occur primarily in the event of temperature changes. As a result of the density being included, the inaccuracy of metering caused by density fluctuations is largely prevented and a high metering accuracy is achieved. As a result, the desired conversion rate is achieved with the maximum possible accuracy without slippage occurring.

The reducing agent solution used is preferably an aqueous urea solution. The urea solution is metered into the hot off gas. In the process, the actual reducing agent, namely ammonia, is released from the dissolved urea. Together with the nitrogen oxides, the ammonia enters the catalytic converter, where it reduces the nitrogen oxides to form nitrogen on the catalytically active surface.

To determine the density, it is preferable to measure the temperature of the reducing agent solution and to control the volume of reducing agent solution to be metered as a function of the density derived from the temperature. The temperature is the significant determining parameter for the density and is easy to determine using standard temperature sensors. Since the reducing agent solution is in liquid form and is virtually incompressible, the density is substantially unaffected by the influences of pressure.

The temperature measurement may be carried out as early as in a reservoir for the reducing agent solution or preferably immediately upstream of a metering device for the volumetric metering of the reducing agent solution. Determining the temperature immediately upstream of the metering device provides a higher level of accuracy, since the actual temperature of the reducing agent solution at the location of the metering device is determined. By contrast, if the temperature is measured in or at the reservoir, heat losses may under certain circumstances occur in a feed line leading to the metering device, and the heat losses should be taken into account when determining the density.

The volume to be metered is advantageously determined from a characteristic curve that shows the relationship between the temperature and the density of the reducing agent solution.

As a result, the volume to be metered is easy to read out from the characteristic curve and does not have to be calculated on an ongoing basis. It is therefore sufficient for the temperature/density relationship to be determined only on a one off basis, either experimentally or by calculation. It is advantageous for a plurality of characteristic curves for different reducing agent solutions to be recorded in a memory element. The reducing agent solutions may differ, for example, in terms of their concentration or their composition. The reducing agent used is generally urea, and the solvent used is generally water.

It is preferable for the temperature of the reducing agent solution to be controlled, so that its density is set at a fixed value, since the density is defined at a predetermined temperature. The advantage of direct temperature control of the reducing agent solution is that the density of the reducing agent solution does not have to be determined by a separate measurement, for example a temperature measurement.

In this case, the temperature of the reducing agent solution is controlled either in the reservoir for the reducing agent solution or immediately upstream of the metering device. Disposing a temperature-control device immediately upstream of the metering device offers the advantage that any heat losses which occur as a result of heat being dissipated by radiation between temperature control device and metering device are negligible.

In addition to determining the temperature of the reducing agent solution, controlling the temperature of the reducing agent solution offers an alternative or additional possibility for using the density of the reducing agent solution to determine the volume of the reducing agent solution which is to be metered per unit time. It is particularly advantageous for the two options to be combined with one another in order to achieve a high metering accuracy. The additional measurement of the temperature leads to a higher level of accuracy during the regulation of the density. This may be advantageous in particular during initial operation, when the temperature control device has not yet set the reducing agent solution to the predetermined temperature.

The temperature is preferably controlled by a temperature control device or heating configuration, specifically, by an NTC heater element. The NTC heater element is an electrical resistance heater element and is characterized in that its resistance has a negative temperature coefficient (NTC), i.e. its resistance and therefore its heating capacity decrease as the temperature rises. The NTC heater element is therefore almost self regulating, so that it can be used to achieve a desired temperature in the reducing agent solution in a particularly simple way without complex control of the heating configuration being required.

The NTC heater element is expediently used as a temperature sensor as well. For this purpose, the resistance of the NTC heater element is determined, representing an unambiguous function of the temperature. As a result, a single element can be used to simultaneously heat the reducing agent solution to a predetermined temperature and directly determine the instantaneous temperature of the reducing agent solution.

In a preferred configuration, the concentration of the reducing agent solution is used to determine the volume to be metered. The concentration of the reducing agent solution is generally an important determining parameter for the volume of reducing agent solution to be metered, since the concentration represents a measure of the amount of reducing agent that is actually dissolved.

Since the concentration may be subject to fluctuations, it is expedient for the concentration to be determined or regulated in addition to the density. The fluctuations in the concentration are caused, for example, by the effects of evaporation or production related differences between various reducing agent solutions which occur when the solution levels are topped up. The concentration is monitored, for example, by a measuring member or, as an alternative or in addition, is set to a predeterminable level by active regulation. For the active regulation, the reducing agent solution is, for example, thermostated to a predeterminable temperature. If the reducing agent solution is in the form of a saturated solution at the predetermined temperature, a fixedly defined equilibrium concentration in accordance with the phase diagram is established between the reducing agent and the solvent. Therefore, corresponding thermostating or temperature control of the reducing agent solution fixes both its concentration and its density in a particularly advantageous way, so that the volume to be metered can be determined very accurately.

With the foregoing and other objects in view there is further provided, in accordance with the invention, a device for catalytically reducing nitrogen oxides contained in an off-gas output from a combustion system. The device contains an off-gas line to be connected to the combustion system for receiving the off-gas. A catalytic converter is disposed in the off gas line. A reservoir for holding a reducing agent solution is provided. A metering device is connected to the reservoir and to the off-gas line for metering the reducing agent solution into the off-gas. A regulating system is connected to the metering device and is configured to meter a volume of the reducing agent solution according to demand, taking into account a density of the reducing agent solution.

The regulating system is configured in such a manner as to be suitable for regulating the density of the reducing agent solution. In this context, the term regulating encompasses both passive monitoring or measuring and actively controlling or setting the density of the reducing agent solution.

For regulating in the sense of monitoring, the regulating system advantageously contains a temperature sensor that can be used to measure the temperature of the reducing agent solution.

For regulating in the sense of controlling, the regulating system preferably contains a temperature control device that can be used to set a defined temperature of the reducing agent solution.

In accordance with a concomitant feature of the invention, the regulating system contains a memory element storing characteristic curves defining a relationship between the temperature and the density of the reducing agent solution.

The advantages that have been explained with regard to the method also apply, mutatis mutandis, to the device.

Other features which are considered as characteristic for the invention are set forth in the appended claims.

Although the invention is illustrated and described herein as embodied in a method and a device for the catalytic reduction of nitrogen oxides contained in the off-gas from a combustion system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
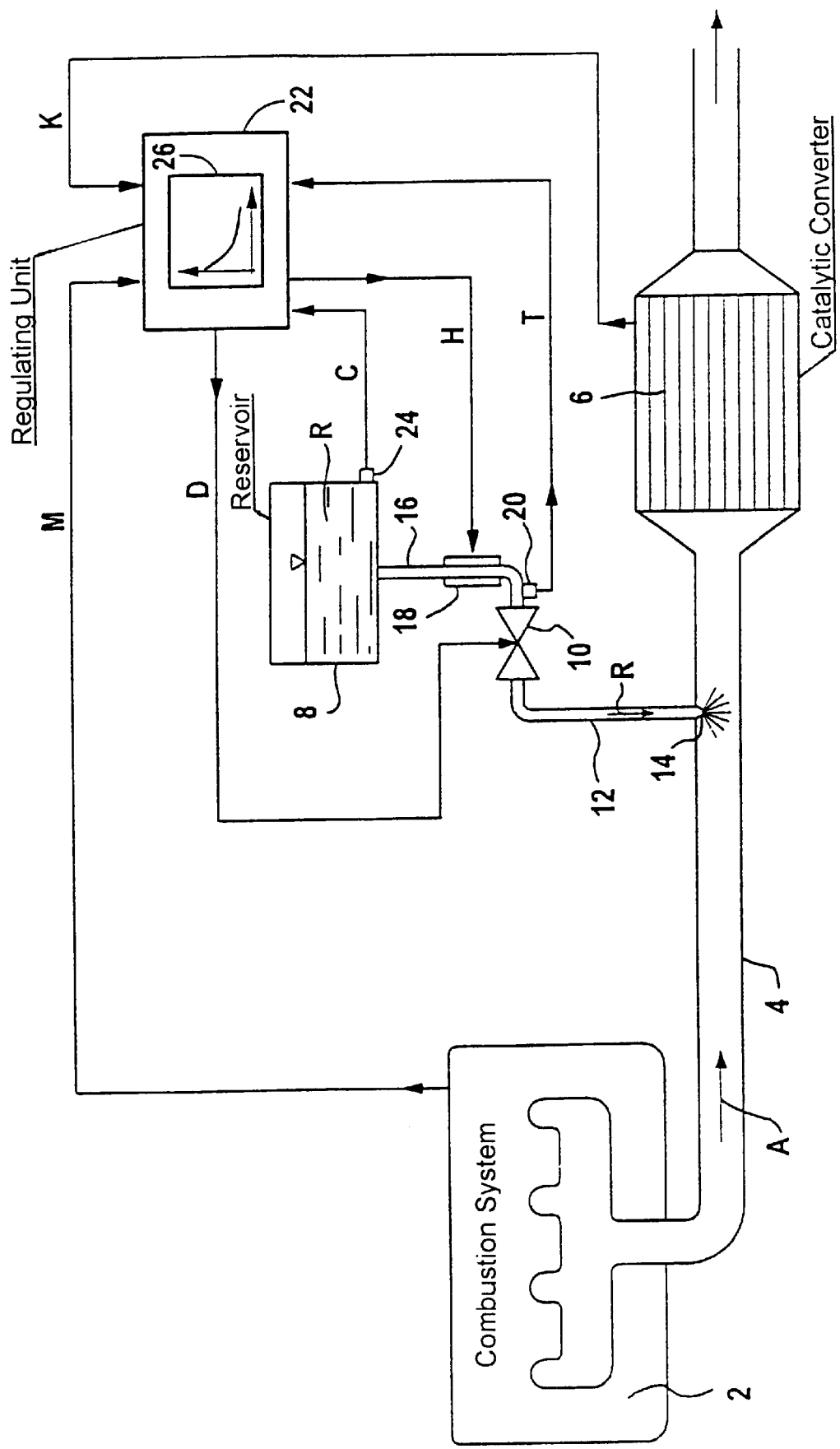
FIG. 1 is a diagrammatic and block diagram of an off gas cleaning installation in which a density of a reducing agent solution is regulated immediately upstream of a metering device according to the invention.

In all the figures of the drawing, sub-features and integral parts that correspond to one another bear the same reference symbol in each case. Referring now to the figures of the drawing in detail and first, particularly, to FIG. 1 thereof, there is shown an off-gas cleaning installation that is connected to a combustion system 2. The off-gas (i.e. exhaust gas) cleaning installation contains an off gas line 4 which is connected thereto for off gas A that is produced during the combustion of fossil fuel. The off gas A flows through a catalytic converter 6 which is connected into the off gas line 4, in particular a DeNO$_x$, catalytic converter 6. The combustion system 2 is in particular an internal combustion engine that is operated with excess air, for example a diesel engine.

A reducing agent solution R is metered from a reservoir 8 into the off gas A before the gas A enters the catalytic converter 6, by a metering device 10. The metering device 10 is, for example, a valve which is used to control a volume of the reducing agent solution R that is metered into the off gas A. The reducing agent solution R is sprayed from the metering device 10, via a metering line 12 which is connected to the off-gas line 4 and a nozzle 14 disposed at the end of the metering line 12, into the off gas A.

The reducing agent solution R used is preferably an aqueous urea solution from which ammonia is released as the reducing agent after it has been introduced into the hot off gas A. Together with the nitrogen oxides contained in the off gas A, the ammonia enters the catalytic converter 6 and reduces the nitrogen oxides to form substantially nitrogen and water on the catalytically active surface of the catalytic converter 6.

The reducing agent solution R is fed out of the reservoir 8 to the metering device 10 via a feed line 16. A temperature-control device 18 and a temperature sensor 20 are disposed on the feed line 16 immediately upstream of the metering device 10. The temperature control device 18 is, for example, a heating sleeve which surrounds the feed line 16 and is used to bring the temperature of the reducing agent solution R to a defined temperature. Alternatively, the temperature control device 18 may also be disposed inside the feed line 16, so that there is intensive contact between the temperature control device 18 and the reducing agent solution R. The temperature control device 18 is preferably configured in such a manner that the reducing agent solution R is at the desired temperature at that end of the temperature control device 18 which faces toward the metering device 10, and remains unaffected by temperature fluctuations in the vicinity of the temperature control device 18. For this purpose, the temperature control device 18 is configured, for example, as an elongate cylinder around the feed line 16. The temperature control device 18 is preferably an electrical heating configuration, and in particular a negative temperature coefficient (NTC) heater element.

The temperature control device 18 is used to set a temperature of the reducing agent solution R which is, for example, a few degrees up to a few tens of degrees above ambient temperature. Alternatively, the temperature control device 18 can also be used to cool the reducing agent solution R. The temperature to be set is selected in such a manner that the minimum possible heating capacity or cooling capacity and therefore the lowest possible energy consumption are required. The temperature to be set may for this purpose be selected as a function of the ambient temperature which is determined, for example, via a temperature probe, which is not shown in more detail.

The temperature sensor 20 is disposed downstream of the temperature control device 18 and upstream of the metering device 10. The temperature sensor 20 is used to determine the temperature of the reducing agent solution R immediately before it enters the metering device 10. Conventional temperature sensors that detect the temperature as quickly as possible are used as the temperature sensor 20.

If the NTC heater element is used as the temperature control device 18, this element can also be used as a temperature sensor as well. It is preferable for the NTC heater element 18 to be incorporated in the feed line 16, so that there is intensive contact between the NTC heater element 18 and the reducing agent solution R. As a result, the NTC heater element 18 can be used to control the temperature of the reducing agent solution R and, at the same time, its temperature can be determined by resistance measurement.

The additional provision of the temperature sensor 20 as well as the temperature control device 18 is particularly advantageous with a view to achieving a high level of metering accuracy. The temperature control device 18 and the temperature sensor 20 may be used in combination or individually to regulate the density of the reducing agent solution R and to use the density for determining the volume of reducing agent solution R which is to be metered.

To control a volume of the reducing agent solution R which is metered into the off gas A per unit time, a regulating system is provided, which includes in particular a regulating unit 22, the temperature control device 18, the temperature sensor 20, the metering device 10 and a measurement member 24 for determining a concentration of the reducing agent solution R. Since, in internal combustion engines which are not operated in a steady state, very different amounts of nitrogen oxides occur in the exhaust gas A per unit time, the amount of reducing agent metered in has to be adapted to the particular demand. In this case, the demand for reducing agent is determined primarily from characteristic data M of the internal combustion engine 2. In addition to the characteristic data M of the internal combustion engine 2, characteristic data K of the catalytic converter 6 are optionally transmitted to the regulating unit 22 as further important parameters. The current demand for the reducing agent is derived from these two sets of characteristic data or parameters. For this purpose, the regulating unit 22 contains, for example, a memory element 26 in which a characteristic map for the different sets of parameters is stored and from which the amount of the reducing agent currently required is determined.

The volume of the reducing agent solution R that is metered in via the metering device 10 is determined on the basis of demand for the reducing agent. This involves in particular a concentration C and the density of the reducing agent solution R. The concentration C has either been determined when the reservoir was filled or, as an alternative or in addition, is determined by the measurement member 24 or defined by the temperature control of the reducing agent solution R, provided that this solution is saturated.

The density of the reducing agent solution R is regulated with the aid of the regulating unit 22. The regulation process includes, first, measuring the temperature of the reducing agent solution R with the aid of the temperature sensor 20, and second setting the temperature of the reducing agent solution R with the aid of the temperature control device 18. To take the density into account, a signal T is transmitted from the temperature sensor 20 to the regulating unit 22, and a signal H is transmitted from the regulating unit 22 to the temperature control device 18. The temperature control device 18 is set to a fixed temperature on the basis of the signal H. Starting from the concentration and density of the reducing agent solution R, the regulating unit 22 determines the volume to be metered. For this purpose, by way of example, a characteristic curve or a characteristic map is stored in the memory element 26, showing the relationship between the temperature and the density. The volume determined and to be metered per unit time is transmitted to the metering device 10 as signal D.

Figure 2:
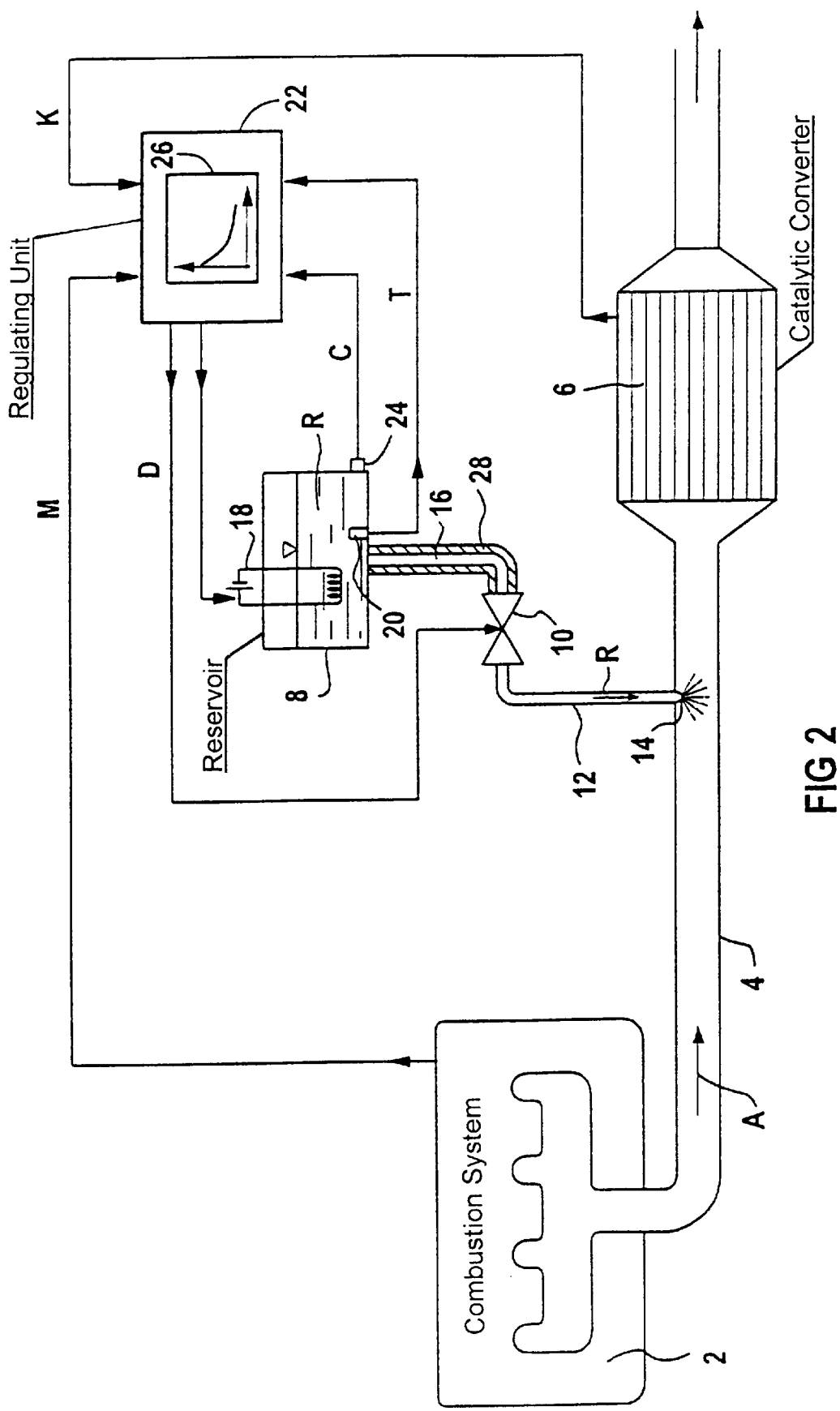
FIG. 2 is a diagrammatic and block diagram of the off gas cleaning installation, in which the density is regulated in a reservoir.

In contrast to FIG. 1, and in accordance with FIG. 2, the temperature control device 18 and the temperature sensor 20 are each disposed in or on the reservoir 8. In this alternative embodiment, heat losses may occur along the feed line 16 leading to the metering device 10. Therefore, the temperature of the reducing agent solution R which is present at the metering device 10 may differ from the temperature measured or set in the reservoir 8, and consequently a correction is necessary for determining the density of the reducing agent solution R. To minimize the heat losses along the feed line 16, the latter is preferably surrounded by insulation 28.

In the method and device for the catalytic reduction of nitrogen oxides contained in the off gas A from the combustion system 2, the essential aspect is the fact that the density of the reducing agent solution R is used to determine the volume to be metered. The density is alternatively or simultaneously passively monitored and actively influenced, in that the temperature of the reducing agent solution R is determined or in that the temperature of the reducing agent solution R is set. Therefore, the density of the reducing agent solution R is regulated in two respects, in order to achieve the maximum possible metering accuracy and to prevent slippage of reducing agent.

We claim:

1. A method for a catalytic reduction of nitrogen oxides contained in a medium flow output from a combustion system, which comprises the steps of:
    channeling an off-gas towards and through a catalytic converter;
    metering a reducing agent solution into the off gas before it flows through the catalytic converter;
    determining an amount of dissolved reducing agent to be metered per unit time according to demand; and
    using a density of the reducing agent solution to determine a volume of the reducing agent solution to be metered per unit time.

2. The method according to claim 1, which comprises:
    measuring a temperature of the reducing agent solution;
    deriving the density from the temperature of the reducing agent solution; and
    controlling the volume of the reducing agent solution to be metered in dependence on the density.

3. The method according to claim 2, which comprises determining the volume to be metered from a characteristic curve which shows a relationship between the temperature and the density.

4. The method according to claim 1, which comprises controlling a temperature of the reducing agent solution and setting the density.

5. The method according to claim 4, which comprises controlling the temperature by use of a heater.

6. The method according to claim 5, which comprises using a negative temperature coefficient (NTC) heater element as the heater.

7. The method according to claim 1, which comprises using a concentration of the reducing agent solution to determine the volume to be metered.

8. The method according to claim 1, which comprises channeling an exhaust gas from an internal combustion engine operated with excess air as the off-gas.

9. A device for catalytically reducing nitrogen oxides contained in an off-gas output from a combustion system, comprising:
    an off-gas line to be connected to the combustion system for receiving the off-gas;
    a catalytic converter disposed in said off gas line;
    a reservoir for holding a reducing agent solution;
    a metering device connected to said reservoir and to said off-gas line for metering the reducing agent solution into the off-gas; and
    a regulating system connected to said metering device and configured to meter a volume of the reducing agent solution according to demand, taking into account a density of the reducing agent solution.

10. The device according to claim 9, wherein said regulating system contains a temperature sensor for measuring a temperature of the reducing agent solution.

11. The device according to claim 10, wherein said regulating system contains a memory element storing characteristic curves defining a relationship between the temperature and the density of the reducing agent solution.

12. The device according to claim 9, wherein said regulating system contains a temperature-control device for setting a defined temperature of the reducing agent solution.

13. The device according to claim 12, wherein said temperature-control device has a heating configuration.

14. The device according to claim 13, wherein said heating configuration has a negative temperature coefficient (NTC) heater element.

15. The device according to claim 9, wherein the off-gas is an exhaust gas from an internal combustion engine operated with excess air.

* * * * *